(12) United States Patent
Ganesan et al.

(10) Patent No.: US 9,405,340 B2
(45) Date of Patent: Aug. 2, 2016

(54) APPARATUS AND METHOD TO IMPLEMENT POWER MANAGEMENT OF A PROCESSOR

(71) Applicant: Intel Corporation, Santa Clara, CA (US)

(72) Inventors: Baskaran Ganesan, Bangalore (IN); Eric Dehaemer, Shrewsbury, MA (US); Vinod Ambrose, Northborough, MA (US); Harjinder Hullon, Santa Clara, CA (US); Joseph Doucette, Waltha, MA (US); Seow Fung Ooi, Gelugor (MY); Min Huang, Cupertino, CA (US); Zhiguo Wang, Palo Alto, CA (US); Yin-Lung Lu, Hillsboro, OR (US); William Johnson Bowhill, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 13/928,724

(22) Filed: Jun. 27, 2013

(65) Prior Publication Data

US 2015/0006915 A1    Jan. 1, 2015

(51) Int. Cl.
*G06F 1/26* (2006.01)
*G06F 1/32* (2006.01)

(52) U.S. Cl.
CPC ....... *G06F 1/26* (2013.01); *G06F 1/324* (2013.01); *G06F 1/3296* (2013.01); *Y02B 60/1217* (2013.01); *Y02B 60/1285* (2013.01)

(58) Field of Classification Search
CPC ............... G06F 1/00; G06F 1/04; G06F 1/12; G06F 1/26; G06F 1/32; G06F 11/30; G06F 15/16

See application file for complete search history.

(56) References Cited

U.S. PATENT DOCUMENTS

| 8,689,021 B1 * | 4/2014 | Bai et al. ...................... 713/300 |
| 8,942,932 B2 * | 1/2015 | Naffziger ........................ 702/60 |

(Continued)

FOREIGN PATENT DOCUMENTS

| EP | 2657840 | 10/2013 |
| WO | 2012086040 | 6/2012 |

OTHER PUBLICATIONS

BDTi, "QDSP6 V4: Qualcomm Gives Customers and Developers Programming Access to its DSP Core", BDTi, Jun. 22, 2012, 4 pages.

(Continued)

*Primary Examiner* — Thomas Lee
*Assistant Examiner* — Mohammad A Rahman
(74) *Attorney, Agent, or Firm* — Trop, Pruner & Hu, P.C.

(57) ABSTRACT

In an embodiment, a processor includes a plurality of cores grouped into a plurality of clusters. The clusters are formed based on a corresponding operating voltage of each core at each of a plurality of frequencies. Each cluster includes a unique set of cores and at least one cluster includes at least two of the cores. The processor also includes a power control unit (PCU) including frequency/voltage control logic, responsive to a frequency change request for a first core of a first cluster, to determine an operating voltage for the first core from a first cluster voltage-frequency (V-F) table associated with the first cluster. The first cluster V-F table uniquely specifies a corresponding operating voltage at each of a plurality of frequencies of operation of the cores of the first cluster. Other embodiments are described and claimed.

18 Claims, 9 Drawing Sheets

(56) References Cited

U.S. PATENT DOCUMENTS

| | | | |
|---|---|---|---|
| 2005/0278676 A1* | 12/2005 | Dhanwada | G06F 17/5068 716/113 |
| 2007/0074011 A1 | 3/2007 | Borkar | |
| 2007/0226482 A1* | 9/2007 | Borkar | G06F 1/32 713/100 |
| 2009/0271646 A1* | 10/2009 | Talwar | G06F 1/3203 713/322 |
| 2010/0064162 A1* | 3/2010 | Rotem | G06F 1/206 713/340 |
| 2012/0159230 A1* | 6/2012 | Chen | 713/600 |
| 2013/0013892 A1* | 1/2013 | Yamashita | G06F 15/17393 712/34 |
| 2014/0173311 A1* | 6/2014 | Park | G06F 1/206 713/320 |
| 2014/0189239 A1* | 7/2014 | Hum | G06F 12/0831 711/122 |
| 2014/0196050 A1* | 7/2014 | Yu | G06F 9/5088 718/104 |
| 2014/0372782 A1* | 12/2014 | Breternitz | G06F 1/3206 713/340 |

OTHER PUBLICATIONS

European Searching Authority, "European Search Report and Written Opinion," dated Oct. 27, 2014, in European application No. EP14173734.

* cited by examiner

APPARATUS AND METHOD TO IMPLEMENT POWER MANAGEMENT OF A PROCESSOR

TECHNICAL FIELD

Embodiments pertain to power management of a processor.

BACKGROUND

In a multi-core processor each core may operate at a different frequency that may be selected based on, e.g., a processing load of the core. In order for a core to operate at a given frequency, voltage supplied to the core needs to be at least a corresponding minimum value for the given frequency. A voltage-frequency (V-F) characteristic of a component specifies a minimum voltage to be supplied in order to support operation of the core at a corresponding frequency, and is related to its physical characteristics including manufacturing variations between components of the same type, intra-die effect etc. For example, different cores in a multi-core processor have unique V-F characteristics because of their physical/manufacturing properties. As a result, each component can be represented by a unique V-F table ("VID table") based on the V-F characteristic.

Storage and retrieval of VID tables for each core may be impractical, due to memory constraints, access latencies, and other considerations.

DETAILED DESCRIPTION

Server processors with larger number of cores typically have large variation in the per-core voltage-frequency (V-F) characteristics due to large-die effects. A single VID representation, e.g., VID table (table of voltage values for discrete frequency points, determined from a corresponding V-F characteristic) may be constructed to be used for a plurality of cores, but typically results in some cores operating at higher than needed voltages for certain operating frequencies. As a result, server processors are prone to have significantly more power losses due to a single VID representation for all the cores, because in semiconductor circuits that are capacitance dominated power loss is proportional to $V^2$, as can be seen from Eq. 1:

$$\text{power}=(V)(I)=(V)(V/X_c)=(V^2)(2\pi fC)=\text{constant}(V^2)(f) \qquad \text{Eq. (1)}$$

where $X_c$ is capacitive reactance$=1/(2\pi fC)$, C is capacitance, and f is frequency.

An approach presented herein is to formulate a plurality of VID representations that is less than the total number of cores in the processor, with each VID representation formed based on a cluster of cores, e.g., each VID representation derived from a composite characteristic of a cluster.

Figure 1:
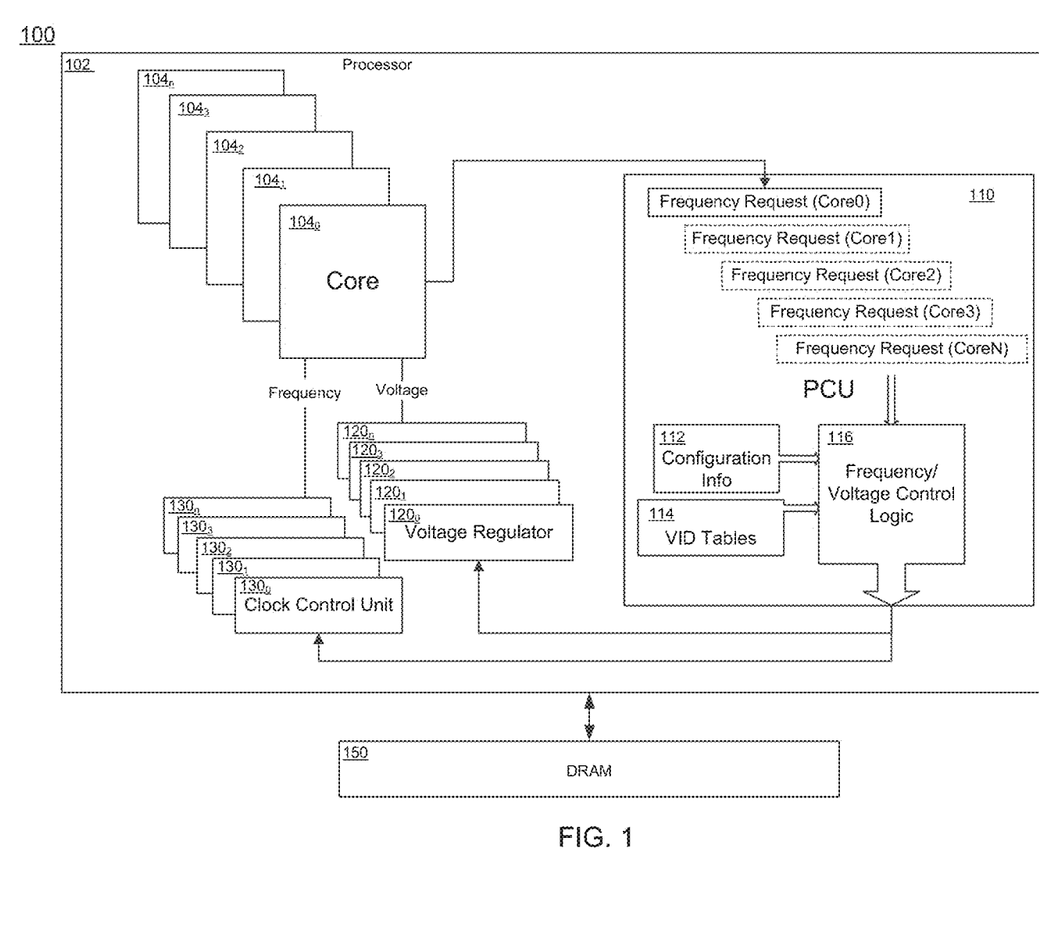
FIG. 1 is a block diagram of a system, according to an embodiment of the present invention.

FIG. 1 is a block diagram of a system 100, according to an embodiment of the present invention. The system 100 includes a processor 102 that includes a plurality of cores $104_0$-$104_N$, a power control unit (PCU) 110, voltage regulators $120_0$-$120_N$, and clock control units $130_0$-$130_N$. The PCU 110 includes configuration information 112, voltage-frequency (VID) tables 114, and frequency/voltage control logic 116. The system 100 also includes a dynamic random access memory (DRAM) 150 coupled to the processor 102 and that can store data and/or program instructions.

In operation, the PCU 110 may respond to an indication of a frequency change for one or more of the cores $104_0$-$104_N$ (e.g., indication may be received, or may be generated by the PCU 110). In response to the frequency change indication, the frequency/voltage control logic 116 may determine, from one of the VID tables 114, a corresponding operating voltage to be supplied to the core $104_0$. The VID table used determine the operating voltage may be selected from the VID tables 114 based on configuration information 112 (e.g., a mask) that associates the core $104_0$ with a cluster of cores having a corresponding VID table. The frequency/voltage control logic 116 may provide an operating voltage value to the voltage regulator $120_0$ that is to supply an operating voltage to the core $104_0$. The frequency/voltage control logic 116 may also provide an indication of the change in operating frequency to the clock control unit 130, which may provide an updated clock frequency to the core $104_0$.

In an embodiment, core operating voltage may be determined at least in part by a logic floor and a cache floor. At high frequency, the logic floor, also called $V_{min}$, generally determines the operating voltage. At low frequency, the cache floor, also called $V_{ccmin}$, generally determines the operating voltage. $V_{min}$ and $V_{ccmin}$ are typically not correlated. Cores of low power product and ultra-low power products may operate near $V_{ccmin}$, which may vary across processor dies and within the dies. $V_{ccmin}$ variation may be large due to increased core middle level cache size and increased core counts. Setting each cache floor to be the highest $V_{ccmin}$ of all cores of a processor may jeopardize overall core power efficiency.

In an embodiment, each core may be operated at its own voltage $V_{ccmin}$ at lowest frequency of operation. For example, a first core may be operated at $V_{op1}$ (high voltage) and a second core may be operated at $V_{op2}$ (low voltage). By operating each core at its own $V_{ccmin}$, the average core voltage at low frequency may be lower than if all cores operate at the $V_{ccmin}$ cache floor of the worst case core (e.g., highest voltage).

Dedicated PCU ROM (or RAM) may be needed to store the voltage values in order for a voltage regulator to control the $V_{ccmin}$ of each core. In an embodiment, to save PCU ROM (or RAM) space, cores with similar $V_{ccmin}$ range can be grouped together to share one $V_{ccmin}$ voltage ($V_{ccmin}$ bucket). The number of the $V_{ccmin}$ buckets can be decided based on the $V_{ccmin}$ target and bin-split needs, e.g., categories of cores that may be determined based upon, e.g., intended use of the processor, or upon other factors.

The $V_{ccmin}$ bucket number and the $V_{ccmin}$ voltage for each bucket may be determined based on $V_{ccmin}$ target and silicon characterization data. During manufacturing testing, the minimum operating voltage for each core may be tested per die, and the per-core bucket numbers may be assigned accordingly. The results may be loaded into fuse registers for each die.

During the chip operations, the PCU 110 can support the per-core $V_{ccmin}$ bucket scheme in various power-performance states (P states), each P state associated with a corresponding frequency of operation. For example, during a reset sequence, a defined bucketing number (m) and its corresponding $V_{ccmin}$ voltages for each bucket ($V_{ccmin\_1}, V_{ccmin\_2}, \ldots V_{ccmin\_m}$) as well as the per-core bucket assignments (i1, i2, ... in) for each die can be read from the fuse registers. A look-up table containing the $V_{ccmin}$ voltage info for each core (e.g., VID tables 114) can be populated. When the chip transitions into a $P_n$ state, the $V_{ccmin}$ voltage values for each core ($core_i$, i=1 to n) can be obtained from the look-up table and can applied to the core through, e.g., the corresponding VR $102_i$. As a result, overall core operating voltage is not penalized by the worst core $V_{ccmin}$ (highest operating voltage). The fuse area usage can be optimized by grouping the cores with similar $V_{ccmin}$ values in the same bucket.

Figure 2:
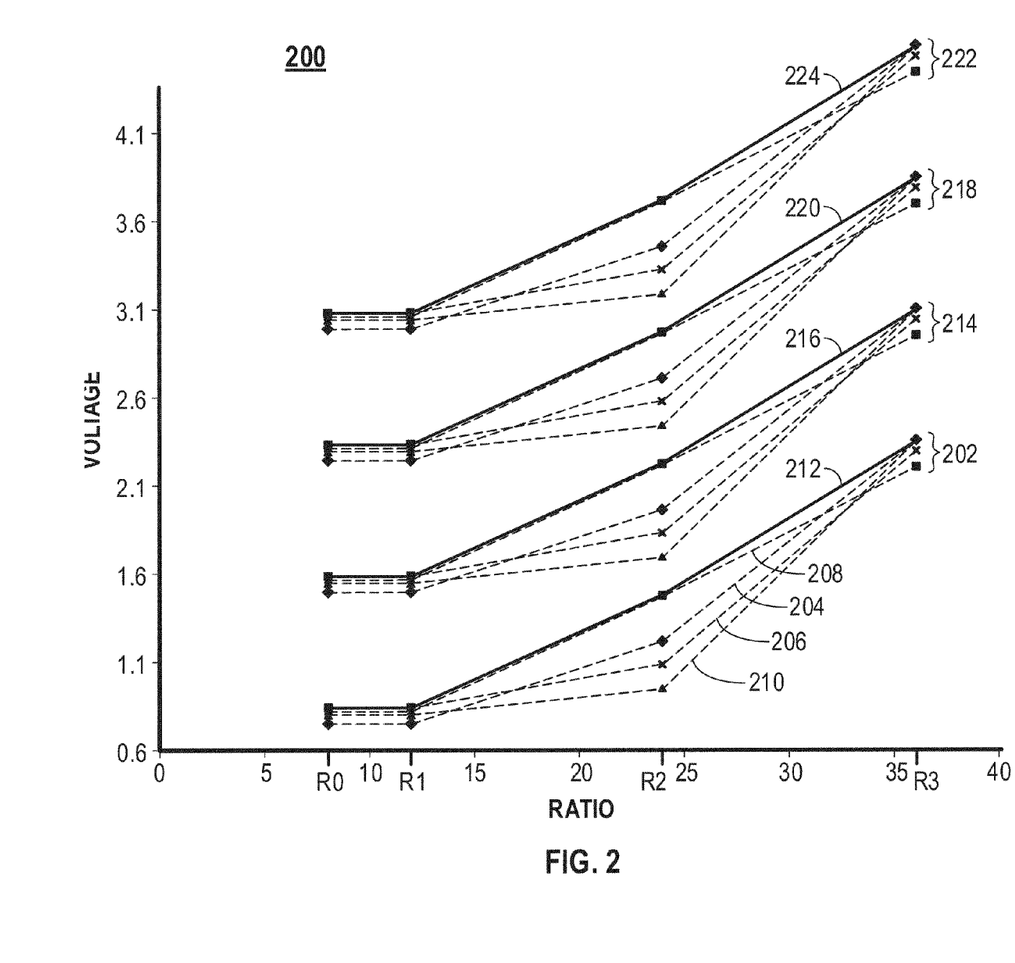
FIG. 2 is a graph of voltage v. frequency for a plurality of core clusters, according to embodiments of the present invention.

FIG. 2 is a graph 200 of voltage v. frequency for a plurality of core clusters, according to embodiments of the present invention. A first cluster 202 includes V-F characteristics 204, 206, 208, and 210, each V-F characteristic (dashed line) corresponding to a respective core of a processor. Each characteristic may be constructed from a limited number of known (e.g., measured) frequency-voltage data points of the corresponding core. For example, each V-F characteristic 204-210 may be constructed based on voltage-frequency data for cores at frequency ratios $R_0$, $R_1$, $R_2$, and $R_3$, where a frequency of operation of the core is given by the frequency ratio multiplied by a base frequency, e.g., base frequency=100 MHz. Each V-F characteristic may be constructed using interpolation techniques between the known data points, e.g., through linear interpolation, quadratic interpolation, or another interpolation technique.

Also shown is a composite curve 212 (solid line) formed by selection of a maximum voltage of the four characteristics 204, 206, 208, and 210, at each of the frequency ratios $R_0$ $R_1$, $R_2$ and $R_3$ and interpolation between successive frequency ratios, e.g., between $R_0$ and $R_1$, between $R_1$ and $R_2$, and between $R_2$ and $R_3$. In other embodiments, other interpolation techniques (e.g., quadratic, etc.) may be employed to determine the composite curve for the cluster. The composite curve 212 may serve to determine an operating voltage value for a particular core of a cluster responsive to a frequency change request received from the particular core. Clusters may be determined by a variety of techniques. For instance, clusters may be determined based on minimum activation voltages of cores at a particular frequency, e.g., each cluster to include a corresponding group of cores with minimum activation voltages having proximate values (e.g., values localized with respect to one another) at the particular frequency, and may be determined by a localization procedure. One such localization procedure may specify, for each member of cluster, a maximum voltage deviation from an average of the minimum activation voltages of members of the cluster. In another embodiment, clusters may be determined based on a difference between a corresponding (minimum) operating voltage of each of a plurality of cores and a (minimum) operating voltage of a first core at each of a plurality of frequencies. Note that the embodiments presented herein are not limited by how clusters are determined.

FIG. 2 includes V-F characteristics for four clusters of cores, 202, 214, 218, and 222, and corresponding composite curves 212, 216, 220, and 224. Each composite curve 212, 216, 220, 224 may be utilized to construct a corresponding V-F table, in accordance with embodiments of the present invention.

Grouping the cores into clusters and determining a composite curve for each cluster may result in smaller losses than might otherwise be incurred (e.g., due to operation of a core at a higher operating voltage than needed for a particular frequency of operation). For example, in the case of sixteen cores, implementing four clusters of four cores each reduces the number of curves from 16 to 4. By constructing 4 composite curves, each composite curve represents a tighter spread of voltages than would a single composite curve for all 16 cores. Without clustering (e.g., only one composite curve constructed for the 16 cores), operation of each of the 16 cores at a same voltage for a particular frequency might result in a significantly greater power loss as compared use of 4 composite curves through clustering. The use of clustering to save power may, in similar fashion, be applied for use with other logics, graphics systems, interconnect systems, etc.

While FIG. 2 illustrates a processor with 16 cores, other embodiments may have a processor with more than 16 cores (e.g., 18 or more cores) or less than 16 cores. Further, although FIG. 2 includes 4 cores in each cluster, other embodiments may include more than 4 or less than 4 cores per cluster. Some embodiments may have different numbers of cores per cluster.

In operation, responsive to a frequency change indication for a first core, an operating voltage for the first core may be determined from the combined characteristic of the corresponding cluster. The operating voltage may be converted into a digital-analog code (DAC) value. The DAC value may be signaled to the voltage regulator (VR) of the first core to transition to the new DAC voltage operating point, along with other VR parameters such as current/bridge-strength, phase counts etc. Change of supplied voltage can happen in tandem with a phase locked loop frequency transition within a clock control unit, e.g., clock control unit $130_0$ of FIG. 1.

Figure 3:
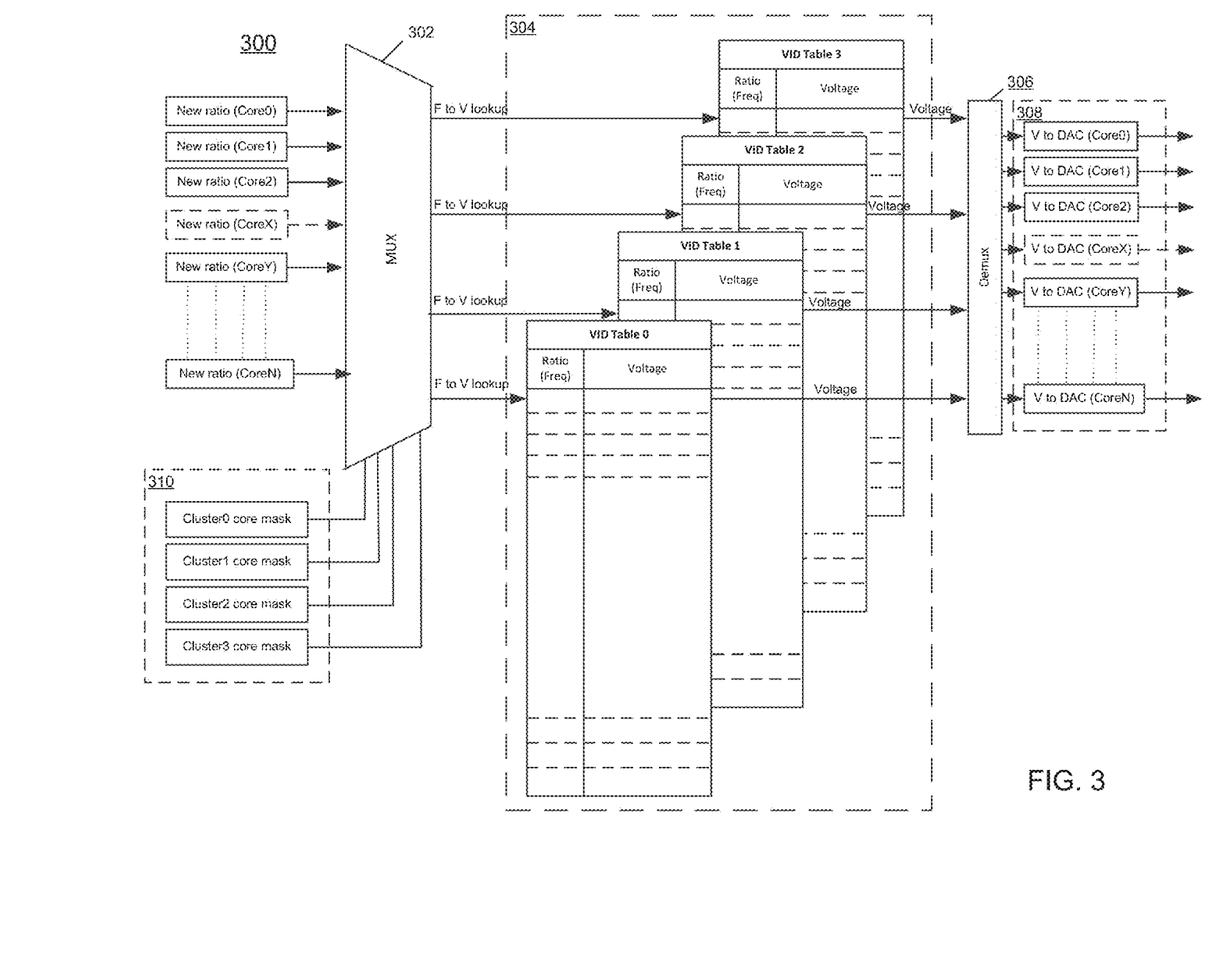
FIG. 3 is a block diagram of a frequency-to-voltage (V-F) lookup apparatus, according to embodiments of the present invention.

Turning to FIG. 3, shown is a block diagram of a frequency-to-voltage (V-F) lookup apparatus 300, according to embodiments of the present invention. In some embodiments, the V-F lookup apparatus 300 may be included in frequency/voltage control logic such as the frequency/voltage control logic 116 of FIG. 1.

The V-F lookup apparatus 300 may include a multiplexer (mux) 302 that can select one of a set of VID tables 304 (each VID table constructed from a corresponding composite characteristic) responsive to a frequency change request received from a first core. The selected VID table of VID tables 304 can output a voltage value via a demultiplexer (demux) 306 that can output the voltage value to a DAC (of a plurality of DACs 308) associated with the first core that requested the frequency change.

Core masks 310 can provide input to the multiplexer 302 to indicate which core has requested the frequency change and which cluster includes the core that has requested the frequency change. The core masks 310 can allow mapping of any number of cores to a particular cluster. For a given core's requested frequency ratio, the multiplexer 302 can identify the corresponding VID table within the set of VID tables 304 and use the corresponding VID table to do the F-to-V determination. In an embodiment, the multiplexer 302 allows each core to belong to only one cluster by selection of only one VID table per core, indicated by the corresponding core mask 310.

In some embodiments, the VID tables 304 are created during boot-time, and may be based on linear or quadratic interpolation between $\{F, V\}$ co-ordinates of measured data points, e.g., at frequency ratios $R_0$, $R_1$, $R_2$, and $R_3$ of FIG. 2. In an embodiment, the frequency ratio points $R_0$, $R_1$, $R_2$, and $R_3$ may correspond to min design, max efficiency, guaranteed and max turbo points of each core. In some embodiments, the measured data $\{F, V\}$ may be stored in fuses of each core. In one example, a minimum of three data points are measured, with frequency ratios of 8, 24, and 28. In other embodiments, additional data points may be measured, e.g., to improve interpolation accuracy. For example, in some embodiments 4 data points or 5 (or more) data points may be measured. In an embodiment, PCU firmware (that may be stored, e.g., in PCU ROM that is written during manufacture) may read the stored data points and may perform interpolation (e.g., linear or quadratic) between the measured data points to create a lookup table that may be stored in, e.g., PCU RAM.

Each segment of the VID composite characteristic of FIG. 2 may be represented as a {slope, offset} for a linear interpolation, e.g., the slope and offset of each segment of the VID composite characteristic may be stored. For a quadratic interpolation, typically three parameters are used, e.g., quadratic parameter, a linear parameter, and an offset parameter for every segment of the VID composite characteristic. In some embodiments, the interpolation parameters are identified using manufacturing flows and are burnt into fuses along with the cluster core masks. During boot-time, PCU firmware may perform a linear or quadratic interpolation between the $\{F, V\}$ points and may populate the VID tables for use during run-time. For example, the VID tables may be populated by the PCU through execution of code, such as code based upon pseudo-code shown in Table 1 (implementation with 4 clusters):

TABLE 1

```
For{every enabled core}
{
 Desired_ratio = {requested ratio input} // Outcome of SW request to do a ratio change
 If (current ratio != desired_ratio) core_change_mask[core_index] = 1;
        If(core_change_mask[core_index] == 1) {
        // Ratio change
        New_pll_ratio = desired_ratio;
        // Update PLL inputs to the FSM
        Call Update_PLL_inputs(core_index, New_pll_ratio);
        Call Core_to_Cluster(input core_index, output cluster_index)
        Call Ratio_to_Voltage[input desired_ratio, input cluster_index, output VR_VOLTAGE] ;
        VR_DAC = DAC_Slope * VR_VOLTAGE + DAC_OFFSET;
        Call Update_VR(input core_index, input VR_DAC);
        Call change_frequency_and_voltage( );
        }
}
Sub Core_to_Cluster(input core_index, output cluster_index){
        // Variable declarations
        Var cluster0_mask, cluster1_mask, cluster2_mask, cluster3_mask;
        // Code (priority mux)
        If(cluster0_mask && (1 << core_index)) cluster_index = 0;
        Else If(cluster1_mask && (1 << core_index)) cluster_index = 1;
        Else If(cluster2_mask && (1 << core_index)) cluster_index = 2;
        Else If(cluster3_mask && (1 << core_index)) cluster_index = 3;
        Else cluster_index = 0;
}
Sub Ratio_to_Voltage(input desired_ratio, input cluster_index, output VR_VOLTAGE){
        Array ratio_to_v_table0[number_of_supported_ratios]; // Initialized during boot-time
        Array ratio_to_v_table1[number_of_supported_ratios]; // Initialized during boot-time
        Array ratio_to_v_table2[number_of_supported_ratios]; // Initialized during boot-time
        Array ratio_to_v_table3[number_of_supported_ratios]; // Initialized during boot-time
        If(desired_ratio > max_supported) desired_ratio = max_supported;
        Case(cluster_index):
        0:      VR_VOLTAGE = ratio_to_v_table0[desired_ratio] ;
        1:      VR_VOLTAGE = ratio_to_v_table1[desired_ratio] ;
        2:      VR_VOLTAGE = ratio_to_v_table2[desired_ratio] ;
        3:      VR_VOLTAGE = ratio_to_v_table3[desired_ratio] ;
        default: VR_VOLTAGE = ratio_to_v_table0[desired_ratio] ;
        endcase;
        Return( );
}
```

Figure 4:
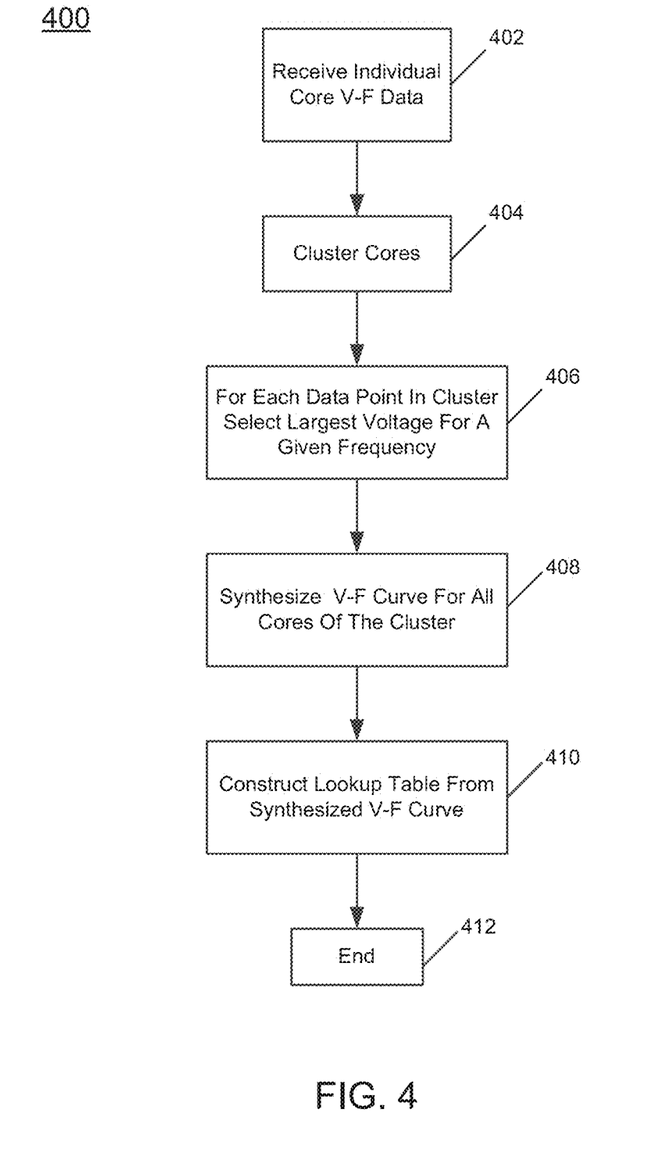
FIG. 4 is a flow chart of a method of creating a V-F lookup table for a cluster of cores, according to an embodiment of the present invention.

FIG. 4 a flow chart of a method 400 of creating a V-F lookup table for a cluster of cores, according to an embodiment of the present invention. In some embodiments, the V-F tables may be created during power-up and may be stored in PCU RAM. The V-F tables may be recreated at each power-up. At block 402, V-F data is received by a PCU from each core of a processor. In an example, the V-F data may include, for each core, several data points at distinct frequencies. Continuing to block 404, the cores may be clustered by PCU firmware in the PCU, e.g., grouped into clusters. In some embodiments, each cluster has a different voltage range for each frequency of the measured data points. Advancing to block 406, for each frequency of V-F data points within a cluster, a largest voltage from among the cores of the cluster is selected to be the voltage (at the frequency) of a combined characteristic of the cluster. By selecting, at each frequency of the recorded data points, the largest voltage needed to run the corresponding core, the combined characteristic will enable each core in the cluster to operate. That is, at any given frequency, the voltage value will be large enough to run every core in the cluster. Moving to block 408, a V-F curve (combined characteristic) is synthesized, e.g., a set of curve portions is determined based on the data points of all the cores of the cluster (e.g., selecting the largest measured voltage of the cores in the cluster at each frequency of a set of frequencies) through use of an interpolation scheme. Proceeding to block 410, the PCU constructs a lookup table from the synthesized V-F curve of the cluster and stores the table, e.g., as a VID table 114 of FIG. 1. The method ends at 412.

Figure 5:
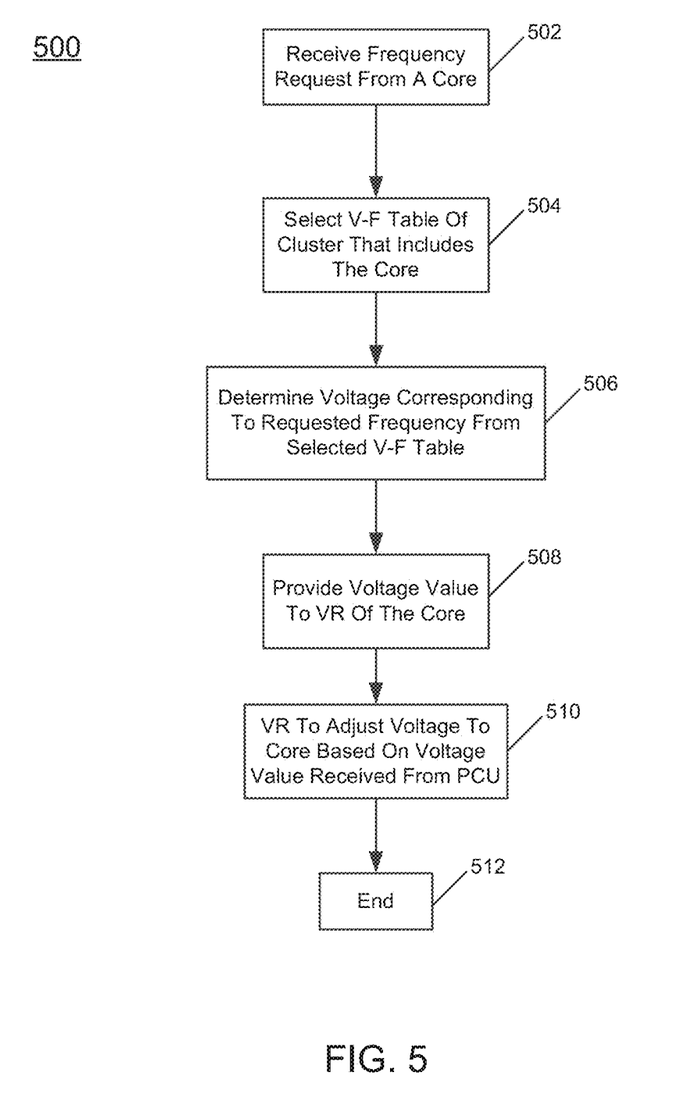
FIG. 5 is a flow chart of a method of providing a voltage to a core, according to an embodiment of the present invention.

FIG. 5 is a flow chart of a method 500 of providing a voltage to a core of a processor, according to an embodiment of the present invention. At block 502, a request to change frequency of operation of the core to a requested frequency is received from the core by a PCU of the processor. Continuing to block 504, the PCU selects a V-F table of a cluster that includes the core. Advancing to block 506, the PCU determines a voltage value corresponding to the requested frequency from the selected V-F table of the cluster. Moving to block 508, the PCU provides the voltage value to a voltage regulator (VR) associated with the core. Proceeding to block 510, the VR adjusts the voltage to the core based on the voltage value received from the PCU. The method ends at 512.

Figure 6:
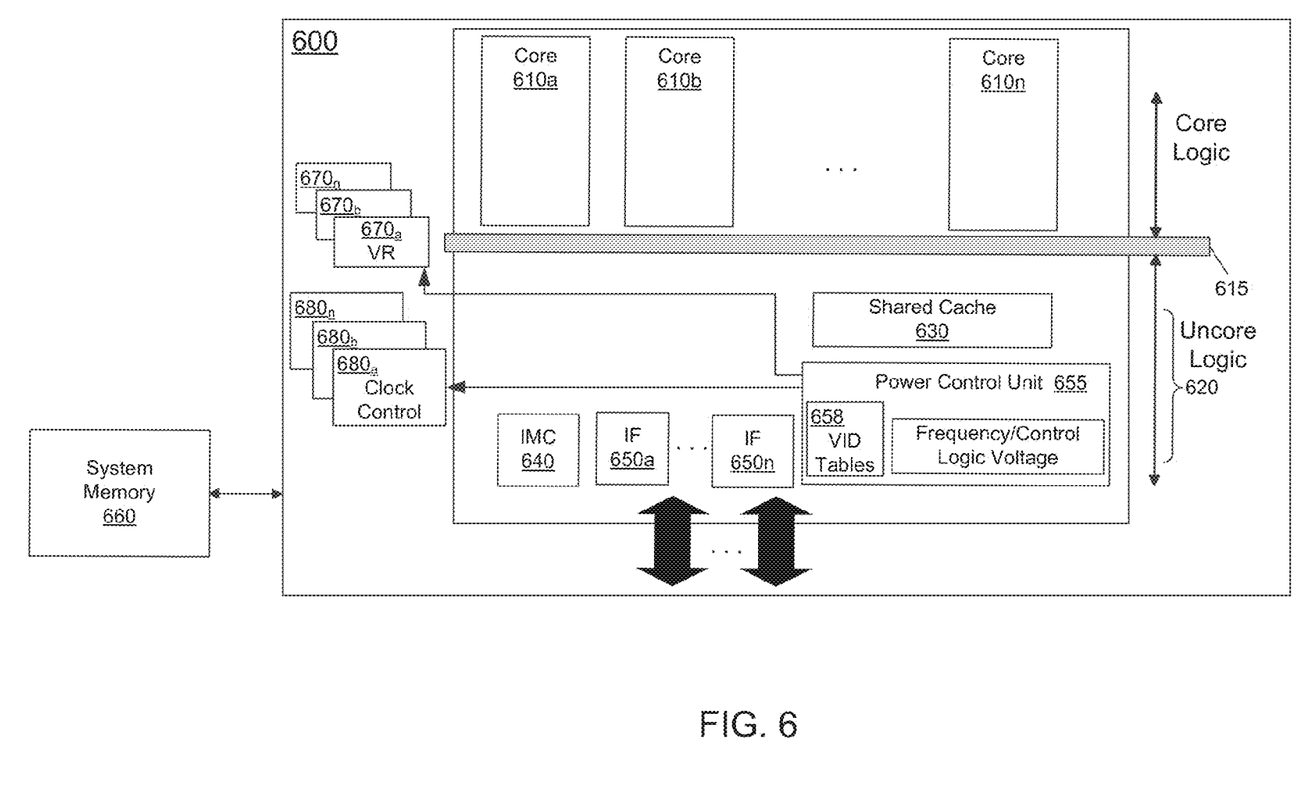
FIG. 6 is a block diagram of a processor in accordance with an embodiment of the present invention.

Referring now to FIG. 6, shown is a block diagram of a processor in accordance with an embodiment of the present invention. As shown in FIG. 6, processor 600 may be a multicore processor including a plurality of cores $610_a$-$610_n$. In one embodiment, each such core may be of an independent power domain and can be configured to operate at an independent voltage and/or frequency, and to enter turbo mode when available headroom exists. The various cores may be coupled via an interconnect 615 to a system agent or uncore 620 that includes various components. As seen, the uncore 620 may include a shared cache 630, which may be a last level cache. In addition, the uncore may include an integrated memory controller 640, various interfaces 650, and a power control unit 655. In the embodiment of FIG. 6, the power control unit 655 may be configured to receive a frequency change request from a particular core of the cores 610a-610n and to determine a corresponding operating voltage based on a VID table associated with a cluster that includes the particular core, according to embodiments of the present invention. Also shown in FIG. 6 are voltage regulators $670a$-$670_n$ to regulate power supplied to the cores 610a-610n based on input received from the Power Control Unit (PCU) 655, according to embodiments of the present invention. Also shown in FIG. 6 are clock control units 680a-680n to provide the requested clock frequency to the respective core 610a-610n, according to embodiments of the present invention.

With further reference to FIG. 6, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 6, the scope of the present invention is not limited in this regard.

Figure 7:
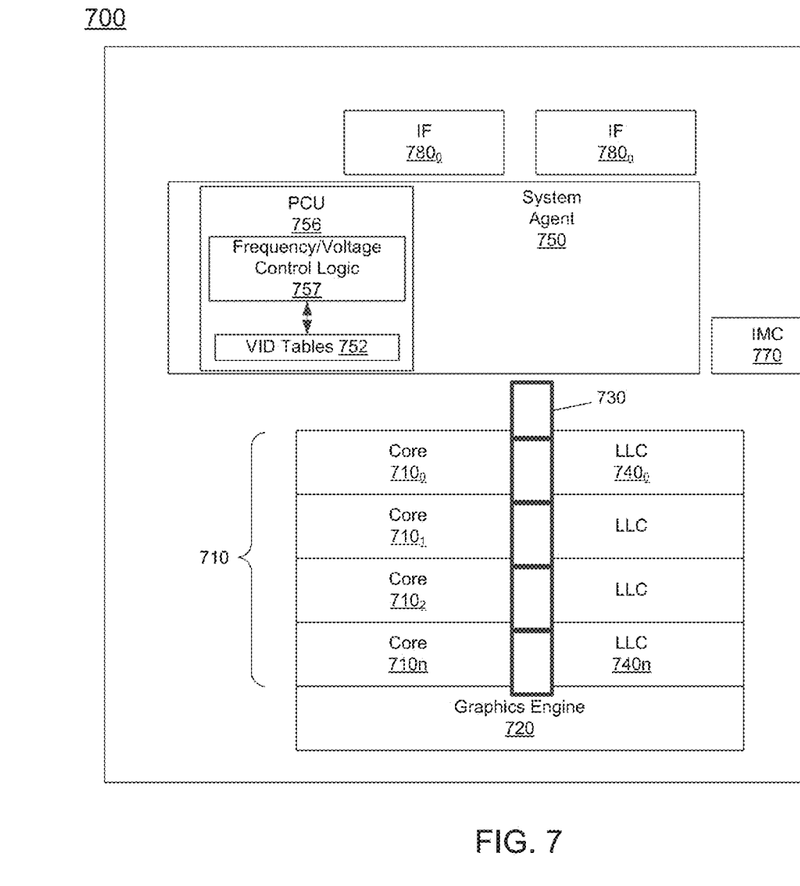
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines, and a system agent domain 750 may further be present. Note that additional domains can be present in other embodiments. For example, multiple core domains may be present each including at least one core.

In general, each core 710 may further include low level caches in addition to various execution units and additional processing elements. The various cores may be coupled to each other and to a shared cache memory formed of a plurality of units of a lower level cache (LLC) $740_0$-$740_n$. In various embodiments, LLC $740_0$-$740_n$ may be shared amongst the cores and the graphics engine, as well as various media processing circuitry. As seen, a ring interconnect 730 couples the cores together, and provides interconnection between the cores, graphics domain 720 and system agent circuitry 750.

As further seen, system agent domain 750 may include a power control unit (PCU) 756 to perform power management operations for the processor. In the embodiment of FIG. 7, the power control unit 756 can include VID tables 757. Each VID table may be associated with a cluster of cores, in accordance with embodiments of the present invention. Responsive to a frequency change request received by the PCU 756 from a first core of the cores 710a-710n, a voltage value may be determined by the PCU 756 through use of the VID table of the cluster that includes the first core, in accordance with embodiments of the present invention.

As further seen in FIG. 7, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 7, understand the scope of the present invention is not limited in this regard.

Figure 8:
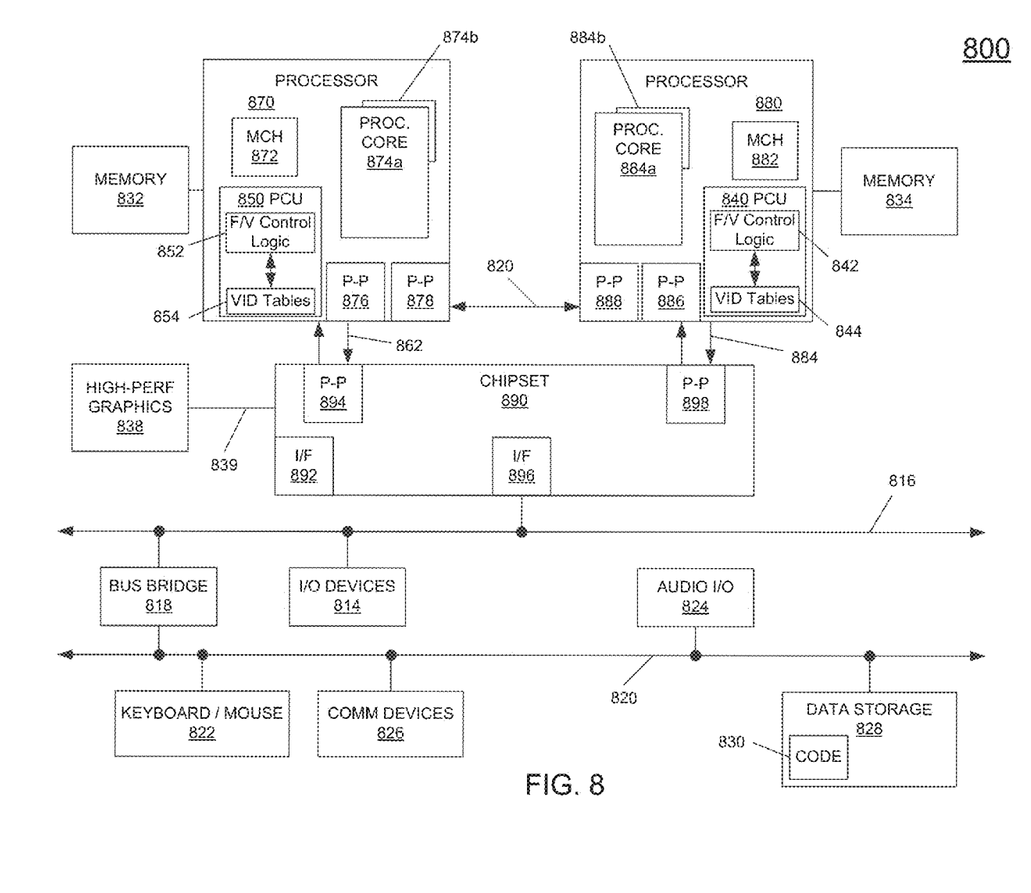
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 820. As shown in FIG. 8, each of processors 870 and 880 may be multicore processors, including first and second processor cores (e.g., processor cores 874a and 874b, and processor cores 884a and 884b), although potentially many more cores may be present in the processors. Each of the processors 880 and 870 may include a PCU (840 and 850, respectively). Each of the PCUs 840 and 850 may include frequency/voltage control logic 842 and 852 respectively, which may be coupled to VID tables 844 and 854, respectively. Each PCU 840 and 850 may provide, responsive to a frequency change request received from a particular core of the respective processor, a voltage value to a voltage regulator (not shown), the voltage value determined based on a VID table associated with a cluster that includes the particular core, in accordance with embodiments of the present invention.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 884, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

Figure 9:
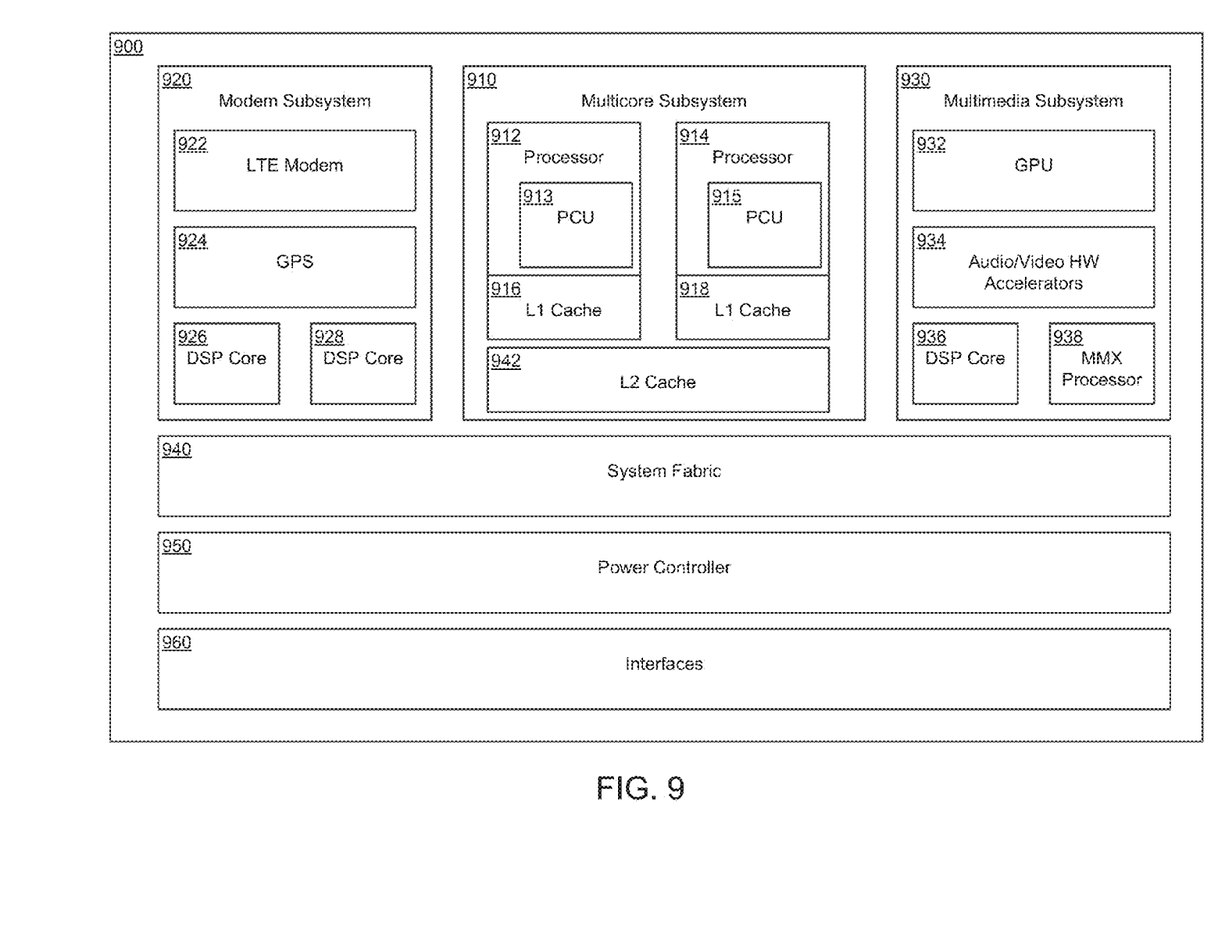
FIG. 9 is a block diagram of a system on a chip (SOC) in accordance with embodiments of the present invention.

FIG. 9 is a block diagram of a system on a chip (SOC) in accordance with embodiments of the present invention. The SOC 900 includes a multicore subsystem 910, a modem subsystem 920, a multimedia subsystem 930, system fabric 940, a power controller 950, and interfaces 960 to interface with one or more external devices. The SOC 900 may perform multiple tasks concurrently, e.g., modem tasks, multimedia tasks, and other processing tasks.

The multicore subsystem 910 includes multicore processors 912 and 914, L1 caches 916 and 918, and L2 cache 942. Each of the multicore processors 912 and 914 may include a corresponding PCU 913 and 915 that may include frequency/voltage control logic (not shown). Each of the frequency/voltage control logics of the PCUs 913 and 915 may be coupled to respective VID tables (not shown), each of which may be stored in the respective PCU. Each PCU 913 and 915 may provide, responsive to a frequency change request received from a particular core of the respective processor, a voltage value to a voltage regulator (not shown), the voltage value determined based on the VID table associated with a cluster that includes the particular core, in accordance with embodiments of the present invention.

The modem subsystem 920 may include a Long Term Evolution (LTE) modem 922 for wireless communication of high speed data. The modem subsystem 920 may also include a global positioning system (GPS) 924, and at least two digital signal processor (DSP) cores 926 and 928.

The multimedia subsystem 930 may include a graphics processing unit (GPU) 932, audio/video hardware accelerators 934, a digital signal processing core 936, and an MMX processor 938, which may be capable of processing, e.g., single instruction, multiple data (SIMD) instructions.

The following examples pertain to further embodiments.

In a first example, a processor includes a plurality of cores grouped into a plurality of clusters. The clusters are formed based on a corresponding operating voltage of each core at each of a plurality of frequencies. Each cluster includes a unique set of cores and at least one cluster includes at least two of the cores. The processor also includes a power control unit (PCU) including frequency/voltage control logic, responsive to a frequency change request for a first core of a first cluster, to determine an operating voltage for the first core from a first cluster voltage-frequency (V-F) table associated with the first cluster. The first cluster V-F table uniquely specifies a corresponding operating voltage at each of a plurality of frequencies of operation of the cores of the first cluster. The processor may also include a plurality of voltage regulators, each voltage regulator to receive a corresponding operating voltage value for a respective core from the frequency/voltage control logic responsive to a respective frequency change request for the respective core, and to supply a corresponding voltage to the respective core based on the received operating voltage value. The first cluster V-F table may be based on a plurality of core V-F pairs for each of the cores of the cluster, where each core V-F pair specifies a corresponding operating voltage of the core at a given frequency of operation, the core V-F pairs of a given core stored in corresponding non-volatile memory within the given core. In an embodiment, for a selected frequency of operation, the corresponding voltage of the first cluster V-F table is at least as large as a largest operating voltage of each of the cores of the first cluster at the selected frequency of operation. In an embodiment, the first cluster V-F table includes at least two cluster V-F pairs, each cluster V-F pair including a corresponding operating voltage and a corresponding defined frequency, where for each of the defined frequencies, the corresponding operating voltage of the cluster V-F pair is selected to be a largest operating voltage of each of the cores of the first cluster at the defined frequency. In an embodiment, the processor includes storage to store a plurality of cluster V-F tables, each cluster V-F table uniquely associated with a corresponding cluster, where each cluster V-F table specifies a distinct operating voltage for each of a plurality of frequencies of operation of the cores of the corresponding cluster. The frequency/voltage control logic may include multiplex logic to select the first cluster V-F table from the plurality of cluster V-F tables responsive to receipt of the frequency change request for the first core.

In a second example, a system includes a processor that includes a plurality of cores grouped into a plurality of clusters, where each cluster includes a unique set of cores and at least one cluster includes at least two of the cores. Each core is selected for inclusion into a particular cluster based on a plurality of voltage-frequency (V-F) pairs associated with the core. The system also includes a power control unit (PCU) including frequency/voltage control logic, responsive to a frequency change request for a first core of a first cluster, to determine an operating voltage for the first core based on a first cluster V-F table associated with the cores of the first cluster, where each frequency of the first cluster V-F table is uniquely associated with a corresponding operating voltage. The system also includes a dynamic random access memory coupled to the processor. The processor may further include a plurality of voltage regulators, each voltage regulator to receive the corresponding operating voltage value for a respective core from the frequency/voltage control logic responsive to a frequency change request for the respective core. Each voltage regulator may supply a corresponding voltage to the respective core responsive to receipt of the operating voltage value. Each of a first plurality of cores may be included in the first cluster based on a difference between the corresponding operating voltage at each of a plurality of frequencies and a corresponding operating voltage of the first core at each of the plurality of frequencies. The frequency/voltage control logic may include multiplex logic to select, from among a plurality of cluster V-F tables, a particular cluster V-F table associated with a particular cluster that includes a particular core responsive to receipt of a frequency change request from the particular core. The first cluster V-F table may include a plurality of voltage-frequency (V-F) pairs including a first operating voltage at a first frequency and a second operating voltage at a second frequency. The first operating voltage and the second operating voltage may be determined based on corresponding V-F pairs of each core of the first cluster, the corresponding V-F pairs stored in respective non-volatile memory of the corresponding core in the first cluster. In an embodiment, each of the first operating voltage and the second operating voltage is at least as large as a largest operating voltage of the cores of the cluster at the corresponding frequency. The processor may include storage to store a plurality of voltage-frequency (V-F) tables, each V-F table uniquely associated with a corresponding cluster, where each V-F table specifies, for the cores of the corresponding cluster, a unique operating voltage for each frequency of a plurality of operating frequencies.

In a third example, a method includes grouping cores into a plurality of clusters by a power control unit of a processor, where each cluster includes a unique plurality of cores and each core is selected for inclusion in a respective cluster based on at least one voltage-frequency (V-F) pair of the core. The method also includes generating, by the power control unit, a distinct V-F table for each cluster based on the V-F pairs of each of the cores in the cluster, where each V-F table associates, for each frequency of a plurality of frequencies, a corresponding unique operating voltage. The method also includes selecting, by the power control unit, an operating voltage at which to operate a first core of a first cluster based on a first cluster V-F table associated with the first cluster, responsive to a frequency change request for the first core. Generating the first cluster V-F table may include determining a first voltage at a first frequency that is a largest voltage of the V-F pairs of the cores of the first cluster at the first frequency. Generating the first cluster V-F table may further include determining a second voltage at a second frequency that is a largest voltage of the V-F pairs of the cores of the cluster at the second frequency, and determining a slope and an offset based on the first voltage and the second voltage. Generating the first cluster V-F table may further include determining V-F table values by interpolating voltage values using the slope and offset. For each cluster, the corresponding V-F table may include at least two cluster V-F pairs based on corresponding core V-F pairs of each core of the cluster, the core V-F pairs of each core stored in non-volatile memory of the respective core, where for each of the at least two cluster V-F pairs of a particular cluster, the operating voltage is selected to be the largest operating voltage of each of the cores at the corresponding frequency.

In a fourth example, at least one computer readable medium has instructions stored thereupon for causing a system to group cores into a plurality of clusters by a power control unit of a processor, where each cluster includes a unique plurality of cores and each core is selected for inclusion in a respective cluster based on at least one voltage-frequency (V-F) pair of the core. The at least one computer readable medium also includes instructions to generate, by the power control unit, a distinct V-F table for each cluster based on the V-F pairs of each of the cores in the cluster where each V-F table associates, for each frequency of a plurality of frequencies, a corresponding unique operating voltage. The at least one computer readable medium also includes instructions to select, by the power control unit, an operating voltage at which to operate a first core of a first cluster based on a first cluster V-F table associated with the first cluster, responsive to a frequency change request for the first core. The instructions to generate the first cluster V-F table may include instructions to determine a first voltage at a first frequency that is a largest voltage of the V-F pairs of the cores of the first cluster at the first frequency. The instructions to generate the first cluster V-F table may further include instructions to determine a second voltage at a second frequency that is a largest voltage of the V-F pairs of the cores of the cluster at the second frequency, and instructions to determine a slope and an offset based on the first voltage and the second voltage. The instructions to generate the first cluster V-F table may further include instructions to determine frequency-voltage table values by interpolation of voltage values using the slope and offset. For each cluster, the corresponding V-F table may include at least two cluster V-F pairs based on corresponding core V-F pairs of each core of the cluster, the core V-F pairs of each core stored in non-volatile memory of the respective core, where for each of the at least two cluster V-F pairs of a particular cluster, the operating voltage may be selected to be the largest operating voltage of each of the cores at the corresponding frequency.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, on-die storage elements, on-die circuitry, on-die register files, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
  a plurality of cores grouped into a plurality of clusters, wherein the clusters are formed based on proximity of a corresponding measured operating voltage of each core of the cluster at one or more of a plurality of frequencies, wherein each cluster comprises a unique set of cores; and
  a power control unit (PCU) comprising frequency/voltage control logic to determine an operating voltage for a first core of a first cluster from a first cluster voltage-frequency (V-F) table associated with the first cluster, wherein the first cluster V-F table is to uniquely specify a corresponding operating voltage at each of a plurality of frequencies of operation of the cores of the first cluster, the first cluster V-F table based on a plurality of core V-F pairs for each of the cores of the first cluster, wherein each core V-F pair is to specify a corresponding operating voltage of the core at a given frequency of operation, the core V-F pairs of a given core stored in a non-volatile memory.

2. The processor of claim 1, further comprising a plurality of voltage regulators, each voltage regulator to receive a corresponding operating voltage value for a respective core from the frequency/voltage control logic and to supply a corresponding voltage to the respective core based on the received operating voltage value.

3. The processor of claim 1, wherein for a selected frequency of operation, the corresponding voltage of the first cluster V-F table is at least as large as a largest measured operating voltage of each of the cores of the first cluster at the selected frequency of operation.

4. The processor of claim 1, wherein the first cluster V-F table includes at least two cluster V-F pairs, each cluster V-F pair comprising a corresponding operating voltage and a corresponding defined frequency, wherein for each of the defined frequencies, the corresponding operating voltage of the cluster V-F pair is selected to be a largest measured operating voltage of the cores of the first cluster at the defined frequency.

5. The processor of claim 1, further comprising a storage to store a plurality of cluster V-F tables, each cluster V-F table uniquely associated with a corresponding cluster, wherein each cluster V-F table is to specify a distinct operating voltage for each of a plurality of frequencies of operation of the cores of the corresponding cluster.

6. The processor of claim 5, wherein the frequency/voltage control logic includes multiplex logic to select the first cluster V-F table from the plurality of cluster V-F tables responsive to receipt of a frequency change request for the first core.

7. A system comprising:
a processor comprising:
a plurality of cores grouped into a plurality of clusters, wherein each cluster comprises a unique set of cores included in a particular cluster based on proximity of a measured operating voltage of the unique set of cores; and
a power control unit (PCU) comprising frequency/voltage control logic to determine an operating voltage for a first core of a first cluster based on a first cluster voltage-frequency (V-F) table associated with the cores of the first cluster, wherein each frequency of the first cluster V-F table is uniquely associated with a corresponding operating voltage, the first cluster V-F table based on a plurality of core V-F pairs for each of the cores of the first cluster, wherein each core V-F pair is to specify a corresponding operating voltage of the core at a given frequency of operation, the core V-F pairs of a given core stored in a non-volatile memory; and
a dynamic random access memory coupled to the processor.

8. The system of claim 7, wherein the processor further comprises a plurality of voltage regulators, each voltage regulator to receive a corresponding operating voltage value for a respective core from the frequency/voltage control logic.

9. The system of claim 8, wherein each voltage regulator is to supply a corresponding voltage to the respective core responsive to receipt of the operating voltage value.

10. The system of claim 7, wherein each of a first plurality of cores is included in the first cluster based on a difference between the corresponding operating voltage at each of a plurality of frequencies and the corresponding operating voltage of the first core at each of the plurality of frequencies.

11. The system of claim 7, wherein the frequency/voltage control logic includes multiplex logic to select, from among a plurality of cluster V-F tables, a particular cluster V-F table associated with a particular cluster that includes a particular core responsive to receipt of a frequency change request from the particular core.

12. The system of claim 7, wherein the first cluster V-F table includes a plurality of V-F pairs including a first operating voltage at a first frequency and a second operating voltage at a second frequency, wherein the first operating voltage and the second operating voltage are determined based on corresponding V-F pairs of each core of the first cluster, the corresponding V-F pairs stored in the non-volatile memory.

13. A method comprising:
grouping cores into a plurality of clusters by a power control unit of a processor, wherein each cluster includes a unique plurality of cores and each core is selected for inclusion in a respective cluster based on proximity of a measured operating voltage of the unique plurality of cores;
generating, by the power control unit, a distinct voltage-frequency (V-F) table for each cluster based on the V-F pairs of each of the cores in the cluster, each distinct V-F table uniquely associating, for each frequency of a plurality of frequencies, a corresponding operating voltage, the V-F pairs stored in a non-volatile memory; and
selecting, by the power control unit, the operating voltage at which to operate a first core of a first cluster based on a first distinct V-F table associated with the first cluster, wherein generating the first distinct V-F table includes determining a first voltage at a first frequency that is a largest measured voltage of the V-F pairs of the cores of the first cluster at the first frequency.

14. The method of claim 13, wherein generating the first distinct V-F table further comprises: determining a second voltage at a second frequency that is a largest measured voltage of the V-F pairs of the cores of the cluster at the second frequency; and determining a slope and an offset based on the first voltage and the second voltage.

15. The method of claim 14, wherein generating the first distinct V-F table further includes determining V-F table values by interpolating voltage values between the first voltage and the second voltage using the slope and offset.

16. The method of claim 13, wherein for each cluster, the distinct V-F table includes at least two V-F pairs based on corresponding V-F pairs of each core of the cluster, the V-F pairs of each core stored in the non-volatile memory, wherein for each of the at least two V-F pairs of a particular cluster, the operating voltage is selected to be the largest measured operating voltage of each of the cores at the corresponding frequency.

17. The processor of claim 1, wherein the unique set of cores of the first cluster each have a measured operating voltage at a first frequency within a deviation threshold of an average operating voltage of the unique set of cores at the first frequency.

18. The processor of claim 1, wherein the first cluster V-F table is formed as a composite of a plurality of measured operating voltages of the unique set of cores of the first cluster at the plurality of frequencies of operation.

* * * * *